Jan. 7, 1947.   H. D. HUME   2,413,873
HARVESTER SUPPORT MECHANISM
Filed May 2, 1946   2 Sheets-Sheet 1
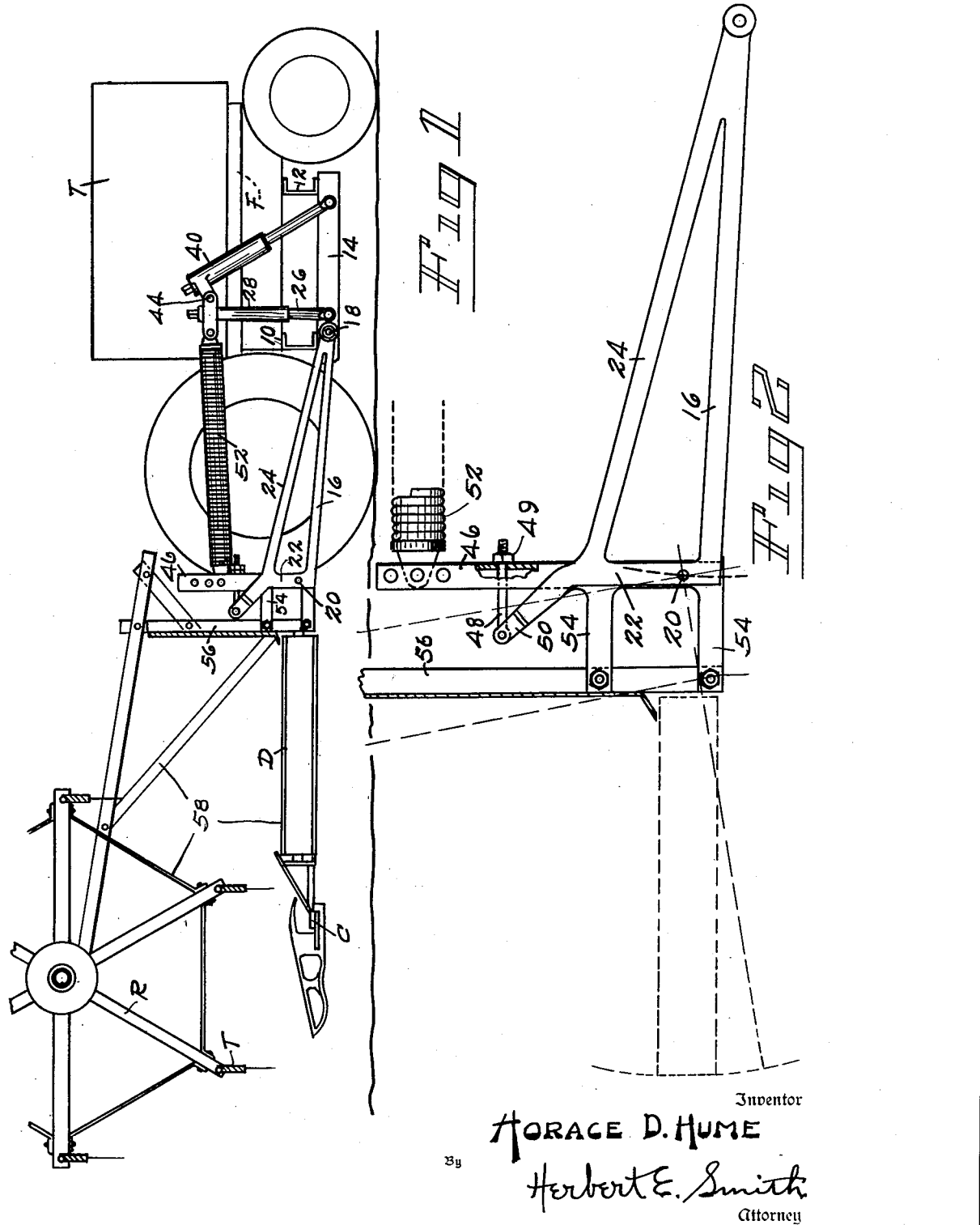
Inventor
HORACE D. HUME
By
Herbert E. Smith
Attorney

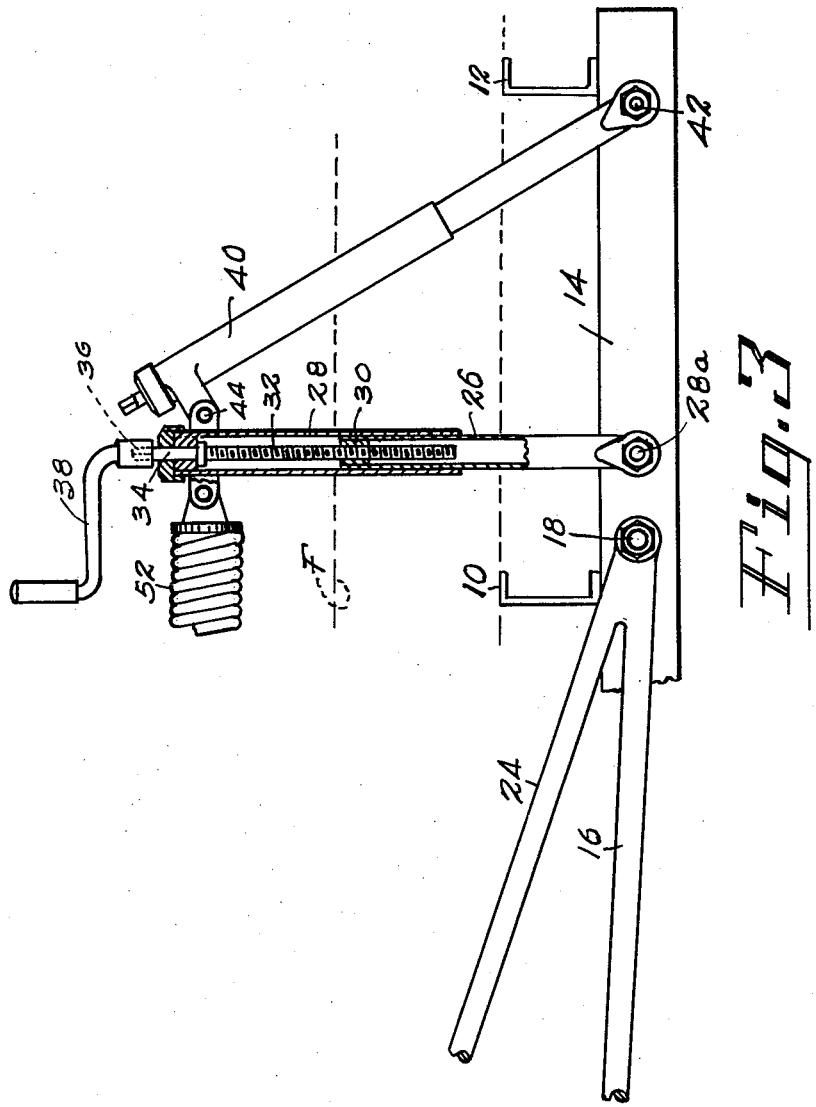

Patented Jan. 7, 1947

2,413,873

UNITED STATES PATENT OFFICE 2,413,873

HARVESTER SUPPORT MECHANISM

Horace D. Hume, Mendota, Ill.

Substituted for abandoned application Serial No. 508,112, October 29, 1943. This application May 2, 1946, Serial No. 666,617

3 Claims. (Cl. 56—25)

This invention relates to a harvester support mechanism and, more particularly, to the provision of resilient and flexible support means for harvester mechanisms that are advanced through a field ahead of a tractor or other power-imparting implement. This application is a substitute for my abandoned application, Serial Number 508,112, filed October 29, 1943.

In recent years the operation of push harvesters has increased widely since it has been observed by the farmers that such mechanisms can more rapidly be brought into position for harvesting and will more efficiently carry on the harvesting operations without trampling a portion of the crop as and because the harvesting operation is under the direct observation of the machine operator. In addition, such harvesting mechanisms have permitted the cutting of low-lying crops, since it has been possible to construct means whereby the cutting and draper mechanism as well as crop-handling reels can be caused to "float" over the surface of the ground closely following the contours thereof to insure that the cutters are forced under the crop, and not through it as previously. However, the resilient support of the cutter, draper and crop handling mechanisms has not been fully and satisfactorily solved in a manner where adjustment to meet varying crop conditions can be conveniently carried out, or in a manner where the desired degree of sensitiveness of crop and ground conditions can be accommodated. Too often the constructions employed have been unsatisfactory as they have been unwieldy and difficult to attach as well as to adjust with respect to the tractor, in addition to the fact that they are expensive to construct because of their complicated nature.

Having in mind the defects of the prior art harvester mechanisms, it is an object of my invention to provide harvester support means for a "floating" harvester that is simple to construct and operate, and which may be readily adapted to varying conditions.

Another object of my invention, is to provide in a floating harvester of the type described tensioning means for a support arm which can be readily adjusted to vary the tensioning effect.

A still further and more specific object of my invention is to provide, in a harvester of the type described, a novel support arm that is easily tensioned and which will adequately support the harvester mechanism in advance of a tractor without being deleteriously affected by hard usage at high speed under many and varied conditions.

The foregoing objects and others ancillary thereto I prefer to accomplish as follows: According to a preferred embodiment of my invention, I mount, outside the longitudinal frame members of a tractor, supplemental longitudinal beams to serve as a base for my support mechanism. Extending forwardly from such supplemental support beams on each side of the tractor is a pair of push arms which are pivotally connected at a lower pivot each to an upright post having a pair of forwardly extending arms to which the frame of the harvester mechanism is attached. Rising from the beam is an extensible mast parallel to the post on the forward end of the lever arms. A resilient link, preferably a spring, is connected between the upper ends of said masts. In addition to being extensible, the mast, mounted upon a longitudinal supporting beam, is also swingably mounted. A variable length brace between the upper end of said mast and the rear portion of the adjacent beam is included in the combination to vary the set of the mast with respect to the supporting beams. Each lever arm is connected to the forward mast by a link, the length of which may be varied to alter the relation of the bell crank and the mast.

The novel features that I consider characteristic of my invention are set forth with particularity in the appended claims. The invention itself however, both as to its organization and its method of operation, together with additional objects and advantages thereof will best be understood from the following description of a specific embodiment when read in connection with the accompanying drawings, in which Figure 1 is a side view of my harvester supporting mechanism;

Figure 2 is an enlarged side view of the principal parts of my supporting mechanism for harvesters; and Figure 3 is a detailed view in elevation of the portions shown in sections for the convenience of illustration of the rear supporting mast on my harvester mechanism.

A harvester supporting mechanism, to overcome the defects hereinbefore enumerated, must have at least two totally distinct characteristics; it must be capable of supporting the harvester elements to conform to the ground surface and the crop conditions with proper resiliency; and it must also be capable of easy adjustment to vary its operations should the operator encounter conditions beyond the accommodations of any one setting of the mechanism. Accordingly, a preferred embodiment of my invention, referring to Figure 1 of the drawings, is constituted by a tractor T shown in Figure 1 as having longitudinal frame members F to which are attached a pair of lateral beams 10 and 12 that in turn support supplementary longitudinal beams 14 in a rigid manner to form a base for my harvester supporting mechanism. The members F, 10, 12, and 14 are all secured together in accordance with customary mechanical practices, usually by bolts, or they may be welded if a non-detachable arrangement is desired.

A lever arm 16 pivotally connected at its rear end at 18 to the beam 14 extends forwardly to provide support for the pivot 20, from which point rises the angularly disposed arm 22 in an upward and slightly forward direction, as shown in the drawings. A brace 24 serves to impart rigidity between arms 16 and 22 to prevent bending or other distortions of those members.

A tubular arm 26 is pivotally connected by a bolt 28a to the beam 14 and rises thereabove to a point where it is inserted into the tube 28. The upper end of tube 26 has a nut 30 secured therein for the reception of the screw 32 that is journalled in bearing 34 in the upper end of the tube 28. The screw 32 is splined at 36 to receive the crank 38, whereby the screw may be manually turned to vary the relative positioning of tube 26 with respect to tube 28 in either extension or retraction. The tubes 26 and 28 comprise a mast adapted by its upright position to support mechanism, more fully described hereafter, by means of a resilient link formed by a spring 52.

Between the upper end of tube 28 and a rear portion of the beam 14 are similar extensible and retractible tubes comprising brace 40 which is connected by bolt 42 to beam 14 and by bolt 44 to the tube 28. The arm or brace 40 is interiorly constructed in the same manner as is the mast and the crank 38 may be employed to turn shaft 45 to vary the length of the brace.

By means of pin 20, a post 46 is supported on the forward end of the arm 16 and rises thereabove. An adjustable link 48 between the horn 50 of arm 22 and the post 46 permits relative adjustment of post 46 about the pivot 20 and with respect to arm 16.

A coil spring 52 is connected at one end to the upper end of tube 28 and at its forward end to one of several positions of the upper portion of post 46.

Post 46 has a pair of forwardly extending arms 54, rigidly connected thereto, for attachment to a frame member 56 of the harvester mechanism indicated as a whole by the numeral 58 as comprising the draper D, the cutter mechanism C, and the crop-gathering tines T of the reel R.

Shortening of the link 48 between horn 50 and post 46 permits forward and downward tilting of the draper D and the cutter C with respect to the arm 16 about the pivot pin 20, in the manner indicated in the dotted lines in Figure 2. Similarly, lengthening of link 48 through the action of the nut 49 on the threaded shank of the link causes the draper to be raised as from the dotted line position to the solid line position of Figure 2. Thus it can be seen that the cutter C and the crop handling reel R, as well as the draper, may be brought closer to or raised farther from the ground surface to accommodate varying types of crops or other conditions.

As shown in Figure 1, the pin 20 is located horizontally above the pivot 18 and is retained there by the action of the spring 52. In this position the draper C is raised slightly above the ground surface. However, the draper may be lowered with respect thereto when desired, by producing a forward tilt of the mast comprising members 26 and 28 through a lengthening action of the brace arm 40. Alternatively, the pin 20 and consequently the set of arm 16 can be raised higher than their positions shown in Figure 1 by shortening of the brace 40.

It will be noted that a supporting lever unit is formed by lever arm 16, the post 46 and the forward extending arms 54. This assembly can be considered as one unit since the parts are rigidly joined at various points and the post is fixed in adjusted position with relation to lever arm 16 through the function of the arm 22, horn 50 and the link 48. The upstanding arm 46 of this lever unit is joined resiliently to the tube portion 28 by spring 52 which tends to draw the upper end of the post rearward and to raise the forward arms 54 about the pivot at 18. Harvester elements secured to the arms 54 will likewise be raised or lowered in accordance with the functioning of the spring 52. Extending or shortening of the mast comprising the members 26 and 28 or tilting or erecting it with respect to its pivot 28a will vary the advantage of the spring 52 in its functions upon the load thereby carried.

In all positions the spring 52, while it always tends to lift the mechanism by drawing rearward on the post 46, will permit downward movement of the arm 16 and the post 46, as is required by crop conditions or a dropping away of the ground below the cutter and the crop pickup means employed in connection therewith.

Although I have shown and described certain specific embodiments of my invention, I am fully aware that many modifications thereof are possible. My invention, therefore, is not to be restricted except insofar as is required by the prior art and by the spirit of the appended claims.

Having thus described my invention, I claim:

1. Support mechanism for positioning harvesting machinery in advance of a tractor, comprising: a lever pivotally attached at its rear to the tractor, a horn on a forward portion of said lever, a post swingably attached to said lever adjacent said horn and rising thereabove, a link between said post and said horn to determine the set of said post, means for connecting said post rigidly to the machinery, a mast on the tractor, and a spring between said mast and said post to resiliently support the lever and the machinery.

2. Support mechanism for positioning harvesting machinery in advance of a tractor, comprising: a lever pivotally attached at its rear to the tractor, a horn on a forward portion of said lever, a post swingably attached to said lever adjacent said horn and rising thereabove, a link between said post and said horn to determine the set of said post, means for connecting said post rigidly to the machinery, a swingable mast on the tractor, and a spring between said mast and said post to resiliently support the lever and the machinery.

3. Support mechanism for positioning harvesting machinery in advance of a tractor, comprising: a lever pivotally attached at its rear to the tractor, a horn on a forward portion of said lever, a post swingably attached to said lever adjacent said horn and rising thereabove, a link between said post and said horn to determine the set of said post, means for connecting said post rigidly to the machinery, a telescoping mast on the tractor, and a spring between said mast and said post to resiliently support the lever and the machinery.

HORACE D. HUME.